United States Patent

[11] 3,598,034

| [72] | Inventor | Minoru Suzuki |
| | | Tokyo-to, Japan |
| [21] | Appl. No. | 780,501 |
| [22] | Filed | Dec. 2, 1968 |
| [45] | Patented | Aug. 10, 1971 |
| [73] | Assignee | Asahi Kogaku Kogyo Kabushiki Kaisha |
| | | Tokyo-to, Japan |
| [32] | Priority | Dec. 2, 1967 |
| [33] | | Japan |
| [31] | | 42/77,093 |

[54] ELECTRIC MOTOR DRIVEN AUTOMATIC FILM ADVANCE
11 Claims, 8 Drawing Figs.

[52] U.S. Cl. .................................................. 95/31 EL, 95/31 AC
[51] Int. Cl. ......................................................... G03b 19/04
[50] Field of Search ........................................... 95/31, 31 AC; 352/169

[56] References Cited
UNITED STATES PATENTS

| 1,963,095 | 6/1934 | Petit et al. .................. | 95/31 AC |
| 2,596,222 | 5/1952 | Doyle et al. ................. | 95/31 AC X |
| 2,827,834 | 3/1958 | Chevillon .................... | 95/31 AC X |
| 3,064,522 | 11/1962 | Fukuoka ..................... | 352/169 |

*Primary Examiner*—Samuel S. Matthews
*Assistant Examiner*—M. L. Gellner
*Attorney*—Stanley Wolder ABSTRACT: An automatic film advance includes a motor connected through a coupling which is disengaged upon a frame advance and actuates a double-throw switch from an automatic motor-energizing circuit to a manual shutter release switch circuit. Actuation of the shutter release switch energizes the motor to release the shutter and switch to automatic circuit, the shutter release opening the energizing circuit and shunt braking the motor during shutter opening and reverses the condition upon shutter closing to advance a film frame. A switch network permits rapid sequence frame advance and shutter operation. Another switch network permits a bulb exposure during which the motor is shunt braked and the energizing circuit opened.

INVENTOR
MINORU SUZUKI
BY *Stanley Wolder*
ATTORNEY

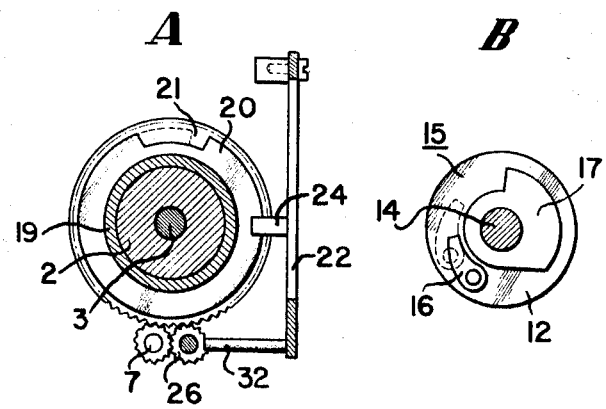
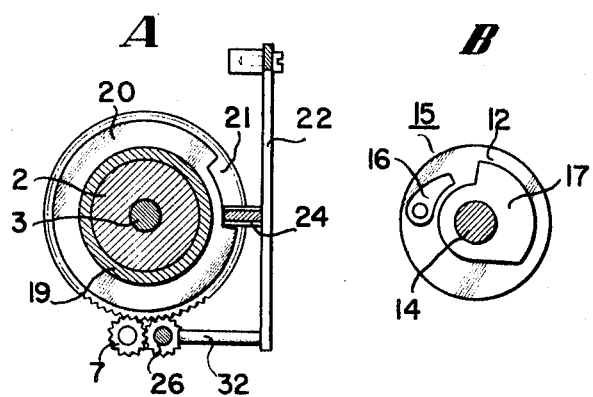
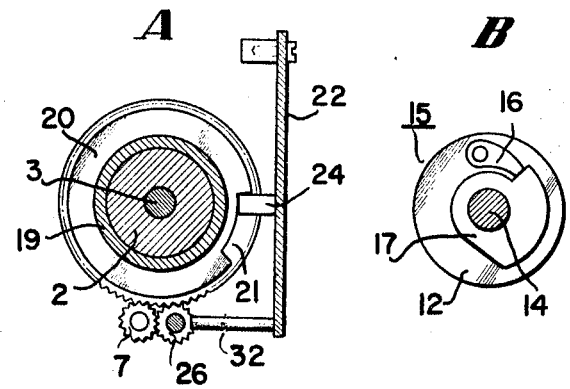

3,598,034

ELECTRIC MOTOR DRIVEN AUTOMATIC FILM ADVANCE

BACKGROUND OF THE INVENTION

The present invention relates generally to improvements in camera film frame-advancing mechanisms and it relates particularly to an improved automatic electric motor-driven film-advancing mechanism in which the frames are automatically advanced either singly or in rapid succession after each exposure and in which the shutter is either instantaneously or bulb actuated.

In automatic film-winding arrangements wherein the film-winding and shutter release actuation are automatically performed by an electric motor under the control of the camera action, an accurate film-winding action must be assured both for successive photographing and for single frame photographing within a wide exposure time variation range including bulb exposure. For this purpose there has been proposed an arrangement wherein upon shutter release the driving motor is electrically braked by short-circuiting the input terminals thereof so as to prevent the film from being advanced before completion of the shutter action.

In the above mentioned arrangement, the motor, to which the current supply is automatically stopped upon completion of film winding, is again supplied with current due to depression of the release-actuating button. The operation of the motor due to this current supply causes shutter release actuation and a circuit changeover operation to establish a current supply circuit necessary for the film-winding operation after completion of shutter action. In the current supply circuit which is established due to circuit changeover after release actuation there are serially inserted a shutter release responsive switch and a switch coupled to said release-actuating button and moving therewith in its depression movement so as to remain open during depression of said button. Through action of these switches the current supply to the motor is stopped while the shutter is open. The closure of said responsive switch in synchronism with the shutter closure and the closure of said coupled switch due to release of the shutter-actuating button cause the film to be wound after completion of shutter for the next photographing.

In case of bulb exposure in which the shutter closure is performed by an actuation from the outside of the camera, for shutter closure the motor must be actuated with the shutter open in the above arrangement. Accordingly, in order to automatically perform bulb exposure in such automatic winding arrangement, a bulb switch to be closed only when bulb operation is to be made is provided in parallel with said shutter release responsive switch so that the current supply to the motor is possible also when the shutter is open, and the motor current supply control upon shutter release is performed through a switch operation caused by the depression of the shutter-actuating button.

In the bulb exposure operation of such arrangement, however, if said bulb switch is closed and the input poles of the motor is short-circuited for breaking the motor, the current source is short-circuited upon shutter release so that the battery power is excessively consumed or the battery is disabled.

SUMMARY OF THE INVENTION

It is a principal object of the present invention to provide an improved camera automatic film frame-advancing mechanism.

Another object of the present invention is to provide an improved electric motor-driven automatic film frame-advancing mechanism in which the motor is braked during the camera exposure interval.

Still another object of the present invention is to provide an improved automatic electric motor-driven film-advancing mechanism which may be selectively operated in a single frame or rapid sequence advance manner.

A further object of the present invention is to provide an improved automatic electric motor-driven film frame-advancing mechanism in which the shutter may be operated instantaneously or bulb timed and the motor is electrically braked during the camera exposure period and disconnected from the energizing current source.

Still a further object of the present invention is to provide a mechanism of the above nature characterized by its ruggedness, reliability, versatility adaptability, efficiency and low current drain.

The above and other objects of the present invention will become apparent from a reading of the following description taken in conjunction with the accompanying drawings which illustrate a preferred embodiment thereof.

In a sense the present invention contemplates the provision of an automatic film frame-advancing mechanism comprising a film takeup member 13, an electric motor 1, a drive transmission means connecting said motor to said takeup member, a current source E, a selector first switch $S_2$ responsive to said transmission means and including alternatively closed first $a$ and second sections $b$ a shutter release second switch $S_3$ connected in series with said first section of said first switch between said motor and said current source, a third selectively actuatable switch $S_6$, a fourth switch responsive to the exposure operation of said camera shutter connected in parallel with said third switch, a fifth switch $S_5$ actuatable with said second switch, and means connecting said first switch second section and said third switch and said fifth switch in series across said motor and said current source.

In the preferred form of the automatic film frame advance there are provided in sixth switch $S_9$ operable with the third switch, a seventh switch $S_7$ operable with the fourth switch, an alternatively closed two section eighth switch $S_1$ and a ninth switch $S_4$. The first switch second section and the sixth and seventh switches are series connected across the motor, the eighth switch first section is connected between the fourth and fifth switches and the second section between the fourth switch and the current source, and the ninth switch is connected across the eighth switch second section. The third and sixth switches are alternately closed and the fourth and seventh switches are alternately closed, the second and fifth switches being normally open and the ninth switch being normally closed. The sixth switch and the eighth switch first section are normally urged to closed positions and the third switch and eighth switch second section to closed positions and there is provided a manually operable actuator for concurrently reversing the conditions of these switches.

The present arrangement overcomes the drawbacks of the earlier automatic film-winding mechanisms and is reliable, efficient and consumes little electric current.

BRIEF DESCRIPTIONS OF THE DRAWINGS

FIG. 6A is a sectional elevational view taken along the line A-A of FIG. 4, and FIG. 6B is a sectional elevational view taken along the line B-B of FIG. 3, both showing the manner of action of the essential part of the arrangement according to the present invention; and FIG. 7A, 7B, 8A and 8B are views similar to FIG. 6A and 6B showing the returning action of the release lever.

DESCRIPTION OF THE PREFERRED EMBODIMENT

Figure 1:
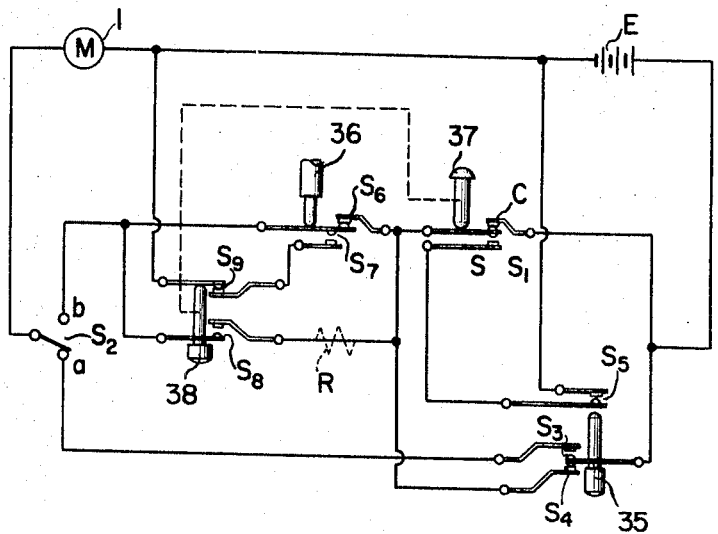
FIG. 1 is a circuit diagram of a mechanism embodying the present invention.

Referring now to the drawings, a drive motor 1 and a current source battery E are intercoupled by parallelly connected manual current supply circuit and an automatic current supply circuit which can be changed over from one to the other through a change over switch $S_2$ to be described later. In the manual current supply circuit there is serially positioned a shutter-actuating normally open switch $S_3$ which is closed through depression of a shutter-actuating button 35; while in the automatic current supply circuit these are series connected a switch $S_6$ which responds to and is closed in the last stage of the camera shutter release action through, for example, a movement coupled to the returning movement of the mirror of a single lens reflex camera, and a normally closed switch $S_4$, the switches $S_3$ and $S_4$ being changed over through depression of a shutter-actuating button 35. In parallel with switch $S_6$ there is connected a bulb switch $S_8$ which is closed only when bulb exposure operation is desired.

A changeover operation can be performed between switch $S_6$ and a normally open switch $S_7$; and similar changeover operation is performed between switch $S_8$ and a switch $S_9$ the movement of the switch $S_9$ being coupled to the switch $S_8$. The switch $S_8$ and $S_9$ and the negative terminal of the current source battery E are serially connected. A double-throw switch $S_1$ is selectively changed over in accordance with the user's desire to perform successive or single-frame photographing. When the arm of switch $S_1$ engages contact C a circuit is established short-circuiting normally closed switch $S_4$, while when it engages opposite contact S there is established a circuit connected to the negative terminal of the current source battery E. In this circuit there is serially inserted a switch $S_5$ which is operated in synchronism with the shutter-actuating switch $S_3$ through depression of shutter-actuating button 35. An actuating rod 36 is coupled in any suitable manner to the camera release arrangement to close the responsive switch $S_6$ in the last stage of the shutter release action. The numeral 38 denoted a bulb-actuating rod in whose depression movement path there are arranged bulb switch $S_8$ and switch $S_9$.

Figure 2:
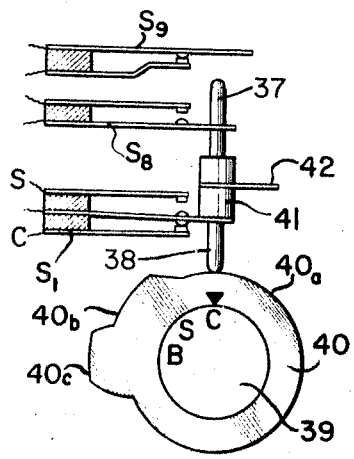
FIG. 2 is an elevational view of a film-winding operation selector assemble employed in the mechanism according to the present invention.

As seen in FIG. 2, a changeover dial 39 is provided with a cam plate 40 which is integral therewith. The cam plate 40 is provided with three steps, namely the lower first step 40a, an intermediate second step 40b and an upper third step 40c. Urged against cam plate 40 is changeover rod 41 under the action of a leaf spring 42. In the movement path of changeover rod 41 there are positioned the changeover contacts or arm of the switch $S_1$, the bulb switch $S_8$ and the switch $S_9$. The movement of the changeover rod 41 under the action of the first step 40a of the cam plate 40 causes changeover of the switch $S_1$. In similar manner, the action of the second step 40b causes the bulb switch $S_8$ to be closed and the action of the third step 40c causes the switch $S_9$ to be opened.

Figure 3:
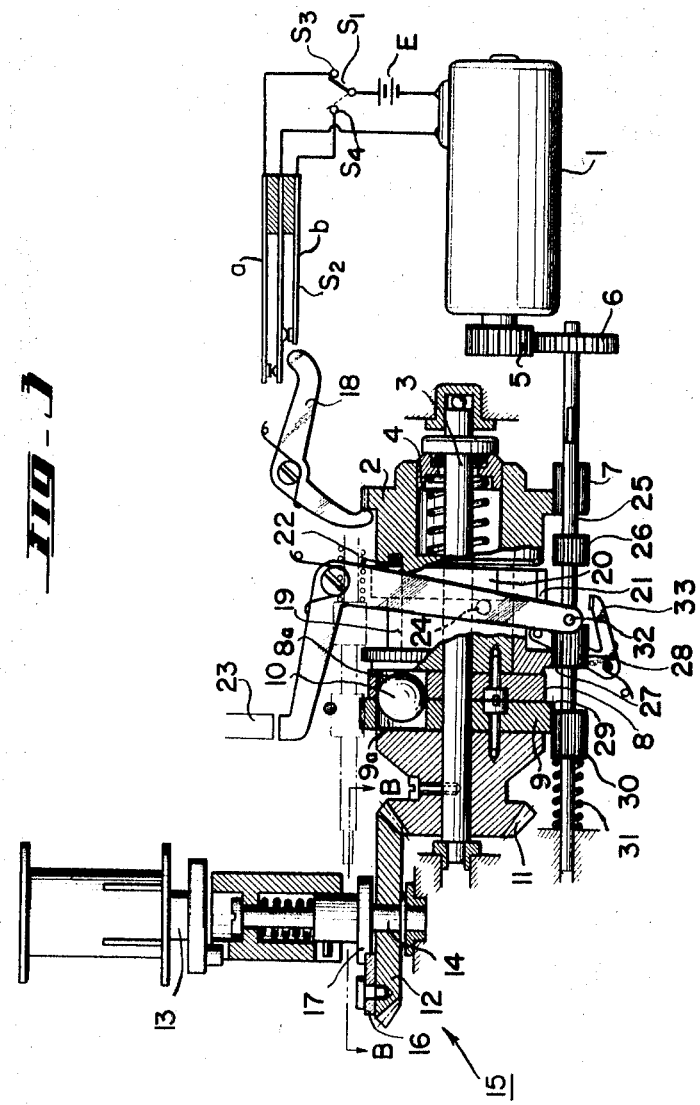
FIG. 3 is a side view partly in section of a form of drive transmission and switch control forming part of the mechanism according to the present invention.

Referring now to FIG. 3, is a driving ring 2 which is coupled through gears 5, 6 and 7 to motor 1, is rotatable and axially movably mounted on a supporting shaft 3, and is normally urged to the left under the influence of a spring 4 arranged between it and a stop on the supporting shaft 3, the ring 2 as shown in FIGS. 3 to 8, being provided with an integral cylindrical tubular shaft section projecting toward the left from the right end of ring 2 and rotatable and axially shiftable therewith on shaft 3 A driving plate 8 is fixed to the left end of the tubular shaft section of driving ring 2. A ball slip joint using a steel ball 10 is arranged between the driving plate 8 and driven plate 9 which is normally in close contact with the driving plate 8. Depressions 8a and 9a are provided in the driving plate 8 and the driven plate 9 respectively so as to accept said steel ball 10. A bevel gear 11 is integral with the driven plate 9 supported by the shaft 3. Another bevel gear 12 engages bevel gear 11 and is coupled through a ratchet arrangement 15 to a shaft 14 coupled to the film-winding shaft 13 on the camera side. A ratched 16 is arranged to the side surface of the bevel gear 12 and a ratchet wheel 17 is integrally fixed to the coupling shaft 14.

A switch lever 18 is pivoted to the camera casing with one end thereof engaging a stepped portion of driving ring 2 and the other operating end positioned adjacent the movable contact or arm of changeover switch $S_2$. In addition to such arrangement for film winding, a release ring 19 is coaxially mounted on the tubular shaft section of and rotatable relative to driving ring 2, and a flange portion 20 at the right end thereof is provided with a cutout 21. A release lever 22 is pivoted to the camera casing and is urged counterclockwise as viewed in FIG. 3. The release lever 22 has one end positioned adjacent the lower end of a camera release pin 23 and the other operating end provided with a pin 24, so that the pin 24 engages the flange portion 20 of said release ring 19.

A shaft 25 is parallel to and positioned forwardly of the shaft carrying the gears 6 and 7 and is longitudinally movable to the left and the right as viewed in FIG. 3 and has affixed thereto a gear 26 which, upon movement to the right with the shaft 25, engages gear 7, and also has affixed thereto a gear 28 which comes into and out of engagement with toothed portion 27 of the release ring 19 in a manner to be described later, and a gear 30 which normally engages the toothed portion 29 of the driven plate 9. A spring 31 urges the supporting shaft 25 to the right. A pin 32 arranged at the end portion of release lever 22 is positioned adjacent the right-side surface of gear 28 (FIG. 3) fixed so as to prevent the shaft 25 from moving to the right under the action of the spring 31. Further, in the path of movement of the gear 28 there is positioned one end of an engaging lever 33. The other end of the lever 33 is positioned in the path of movement of the right hand face of the toothed portion of ring 19 which moves axially with driving ring 2 so that, in the operation to be described later, when the driving ring 2 moves to the right it swings the lever 33 clockwise against the action of the spring attached thereto, causing the first mentioned end portion to withdraw from the movement path of gear 28.

The operation of the above described mechanism is as follows:

In ordinary photographing operation with the shutter speed set and in the state wherein film winding and shutter charge operations have been completed following a previous photographing operation (FIG. 5), manual depression of the shutter-actuating button 35 causes the shutter-actuating switch $S_3$ to be closed so that a current supply is fed to the motor 1 through the manual current supply circuit and the motor 1 is energized. Then the driving power of the motor 1 is transmitted through the gears 5, 6 and 7 to the driving ring 2 and the driving plate 8. The driving power is also transmitted through the gears 7, 26 and 28 to the release ring 19 so that the driven plate 9 and the release ring 19 rotate in the reverse direction relative to the driving plate 8.

Due to this reverse rotation, the relative state of the release ring 19 and the ratchet 16 and the ratchet wheel 17 of the ratchet arrangement 15 shifts form what is shown in FIG. 7 upon completion of the preparation for photographing operation to what is shown in solid lines in FIG. 6. The rotation in the reverse direction to each other of the driving plate 8 and the driven plate 9 causes the steel ball 10 of the ball slip joint, which has emerged from the hold 9a upon completion of film-winding operation, to again engage the hole 9a. At this time, as shown in FIG. 6, the flange portion 20 of the release ring 19 is in such a position that the cutout 21 is not in registration with the pin 24 of the release lever 22, so that, due to the push upon the pin 24 by the flange portion 20, the release lever 22 swings clockwise against the action of the spring. The swinging release lever 22 raises the camera shutter release pin 23 so as to initiate the shutter-opening operation. At the same time, the pin 32 arranged at the other operating end of the lever 22 abuts against the gear 28 and pushes it to the left against the action of the spring 31, so that the gear 26 fixed to the supporting shaft 25 is brought to such a position that it is out of engagement with the gear 7. Thus the coupling arrangement, which has served to transmit the power for rotations in reverse directions to each other of the release ring 19 and the driven plate 9 upon the above described release operation, is disabled.

On the other hand, due to the shift to the left driving ring 2 causes the switch lever 18 to the swung clockwise against the action of the spring so that the switch $S_2$ is so changed over as to break the current supply circuit for the motor 1 which has been hitherto established, and the film-winding section and the release-driving section return to the condition shown in FIG. 3. At this time, in the automatic current supply circuit, the switch $S_6$ is opened due to depression of the operating rod 36 acting in response to shutter release operation and the changeover switch $S_7$ is closed, the operating switch $S_8$ to be closed only upon bulb shutter operation is in such a state as to open the circuit, and the switch $S_9$ is closed. Accordingly there is established a short circuit of the input terminals of the motor starting from the motor 1 and passing through, the switch $S_9$, the changeover switch $S_7$, and the responsive switch $S_2$, and returning to the motor 1. Thus, upon depression of the shutter-actuating button 35, the shutter release is actuated and simultaneously the motor 1 is abruptly arrested or electrically braked so that the winding mechanism instantaneously stops.

Then, as shown in FIG. 3, such a state is maintained wherein due to push upon the pin 24 of the release lever 22 by the flange portion 20 of the release ring 19, the release lever 22 has swung clockwise against the spring urge, and one end of the release lever 22 has raised the camera shutter release pin 23. On the other hand, the pin 32 fixed to the other end of the release lever 22 abuts against the side surface of the gear 28. Therefore, the supporting shaft 25 is prevented from moving to the right so that the gear 28 is in engagement with the toothed portion 27 of the release ring 19 and the gear 30 is in engagement with the toothed portion 29 of the driven plate 9.

When due to the shutter action film exposure is accomplished and in the last stage of the release action the operating rod 36 makes its upward return movement, the switch $S_7$ is opened and the switch $S_6$ is closed. If successive photographing is desired and in the automatic current supply circuit the switch $S_1$ is closed to the side of the contact C, then said closure of the responsive switch $S_6$ establishes the automatic current supply circuit. Thus, current supply to the motor 1 is started and the motor 1 is again actuated. The driving power of the motor 1 is transmitted through the gears 5, 6 and 7 to the driving ring 2. At this time, since the steel ball 10 between the driving plate 8 and the driven plate 9 is within the holes 8a and 9a, the ball slip joint consisting of the driving plate 8, the driven plate 9 and the steel ball 10 is in an engaged state to transmit the driving power. Accordingly, the driving power which has been transmitted to the driving ring 2 is transmitted to the driven plate 9, then, through the bevel gear 11 and the bevel gear 12 in engagement therewith, and the ratchet arrangement 15, the driving power tries to wind the film by driving the film-winding shaft 13.

At this time, in the ratchet arrangement 15 the relative positions of the ratchet 16 and the ratchet wheel 17 are as shown in FIG. 6 in broken lines and there is some play before engagement of these due to rotation of the bevel gear 12 for driving the film winding shaft 13. While due to said driving action the bevel gear 12 rotates and the ratchet 16 moves to the position as shown in FIG. 7, through the gear 30 engaging the toothed portion 29 of said driven plate 9 and the coaxially fixed gear 28 the release ring 19 is driven. The resulting rotation of the release ring 19 brings the cutout 21 of the flange portion 20 thereof up to the position of the pin 24 of the release lever 22, so that the pin 24, which has been under the pushing action of the sidewall of the flange portion 20, falls into the cutout 21 (FIG. 7), and the release lever 22 swings counterclockwise on FIG. 3 due to the spring urge and returns to the former position occupied before release actuation.

This returning movement of the release lever 22 causes the shutter release pin 23 to move down. On the other hand, this movement of the release lever 22 causes the pin 32 at one end thereof to be moved to the right on FIG. 3, so that he gears 28 and 30 and the supporting shaft 25, which have been prevented by the pin 32 from moving, move to the right due to the action of the spring 31. During this movement, the gear 28 engages one end of the engaging lever 33 so that this movement is temporarily stopped at a position where the gear 28 comes out of engagement with the toothed portion 27 of the release ring 19. Thus the release ring 19 comes out of drive-coupled state.

Figure 4:
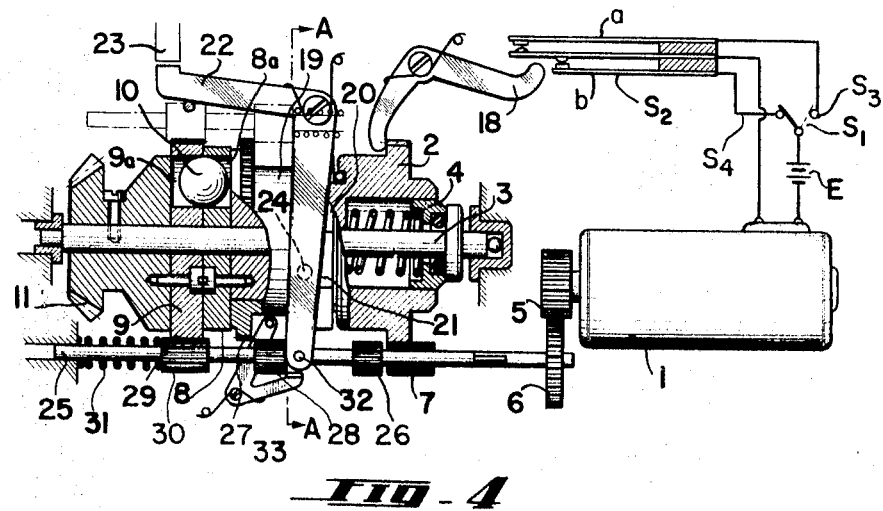
FIG. 4 is a view similar to FIG. 3 illustrated in a condition with the release lever returned to the position to be occupied before shutter release.
Figure 5:
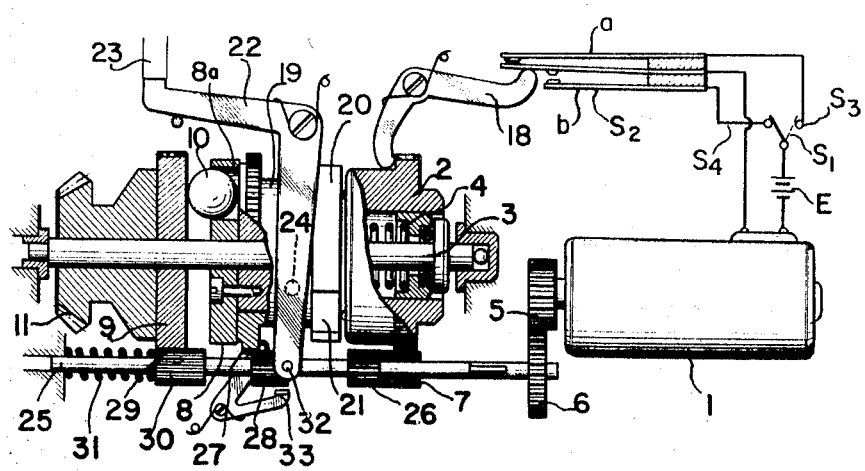
FIG. 5 is a view similar to FIG. 3 shown upon completion of the film-winding operation.

The driving action of the motor 1 following this return action of the release lever 22, the ratchet 16, which is driven by aforementioned driving power transmission system, engages the ratchet wheel 17 and rotates the wheel 17 so that the driving power of the motor 1 is transmitted to and rotates the winding shaft 13. This action performs film-winding operation or advance and is shown in FIGS. 4 and 7. During this action the release ring 19 slips over the driving ring 2.

When an increment frame or predetermined length of the film is wound upon the winding shaft 13 the film is automatically releasably locked against further advance through the action of the conventional film metering mechanism or length winding arrangement so that an excessive load is exerted upon the driven plate 9 through gears 11 and 12 to retard its further rotation and maintain it stationary. As a result of the stopping of plate 9 a ball-slip or cam action is exerted by ball 10 between the driven plate 9 and the steel ball 10 leaves the hole 9a of the driven plate 9 and, the driving plate 8 is pushed by the ball 10 and moves to the right against the action of the expanding spring 4 (FIG. 5) to effect the uncoupling of plates 8 and 9 by ball 10 thereby substantially eliminating any torque transmission from plate 8 to plate 9 and hence to winding shaft 13.

Upon this movement of the driving plate 8, the driving ring 2 and the release ring 19, which are integral with the driving plate 8, move likewise to the right, so that the side surface of the toothed portion 27 of the release ring 19 engages and pushes one end of the engaging lever 33 whose the other end has engaged the gear 28. Accordingly, the engaging lever 33 swings clockwise on FIG. 4 against the spring urge, so that the lever 33 disengages the gear 28. Then due to the action of the spring 31, the gear 28 and the supporting shaft 25 move further to the right on FIG. 4 so that the gear 28 engages the toothed portion 27 of the release ring 19 again, while, on the other hand, the gear 26 fixed to the supporting shaft 25 comes into engagement with the coupling gear 7. At this time, the gear 30 remains engaging the toothed portion 29 of the driven plate. Accordingly, the driven plate 9, which has been coupled through the driving ring 2 and the driving plate 8 to the motor 1, now enters the state where it is coupled through shaft 25. This new coupling causes the driven plate 9 to be rotated in a direction which is reverse to that in the previous coupling, and at the same time, the release ring 19 is rotated in a direction which is reverse to that of the driving ring 2.

The movement of the driving ring 2 causes the switch lever 18, which has the operating end thereof engaging the sidewall of the stepped portion of the driving ring 2, to be swung, so that the other operating end of the switch lever 18 pushes up the movable contact of the switch $S_2$, so that the switch $S_2$ is changed over from the contact $b$ side to the contact $a$ side, returning it to the state as mentioned in the beginning portion of this description.

When one frame photographing operation is to be made according to the above mentioned shutter speed setting photographing operation, the switch $S_1$ is changed over prior to photographing operation by operating the changeover button 37 so as to close the contact S. As a result, the normally closed switch $S_4$ is serially inserted in the automatic current supply circuit. Therefore, when, due to an action similar to that mentioned above, shutter release is completed and the responsive switch $S_6$ is closed, the normally closed switch $S_4$ remains open due to depression of the shutter-actuating button 35 so that the motor 1 is not actuated. Thus, the motor 1 remains inoperative until the normally closed switch $S_4$ is closed due to release of the shutter-actuating button 35. Upon release of the actuating button 35, film-winding and shutter-charging operation for the next photographing is started in a manner similar to that for successive photographing as mentioned above.

When bulb exposure photographing is desired, the changeover button 37 is set to above mentioned one frame photographing state, and the bulb-operating button 38 is so operated as to close the bulb switch $S_8$ and open the switch $S_9$. Then, upon depressing the release-actuating button 35, in the manner as described above, the motor 1 is supplied with current from the manual current supply circuit and actuates shutter release. At the same time, the switch $S_2$ is changed over from the contact $a$ side to the contact $b$-side so that the automatic current supply circuit for the motor 1 is established. Release actuation causes, in the automatic current supply circuit, the responsive switch $S_6$ to be opened and the changeover switch $S_7$ to be closed. In the automatic current supply circuit, however, the bulb switch $S_8$, which is in parallel with the responsive switch $S_6$, has been closed, so that the opening and closure of the automatic current supply circuit is under the control of the normally closed switch $S_4$ which is actuated in response to the shutter-actuating button 35. Therefore, now that the switch $S_4$ is open due to release-actuating depression of the actuating button 35, the automatic current supply circuit is now open.

On the other hand, since the switch $S_9$ is open due to operation of the bulb-operating button 38, closure of the changeover switch $S_7$ coupled to release-actuating action does not close aforementioned motor-arresting circuit forming the loop of motor 1—the switch $S_2$—the changeover switch $S_7$—the motor 1. Instead, however, there is closed another motor-arresting circuit forming the loop of motor 1—the switch $S_2$—the bulb switch $S_8$—the switch $S_1$ (the contact S-side)—the switch $S_5$ closed due to depression of said actuating button 35—the motor 1, so that the operation of the motor 1 is arrested immediately after shutter release actuation due to the short circuiting of the motor terminals and the consequent high electric loading of the motor which functions as a loaded generator and the driving power is abruptly stopped. Accordingly, the shutter is kept open.

When, after the lapse of predetermined time, the shutter-actuating button 35, which has been depressed, is released, the normally closed switch $S_4$ is closed and at the same time the switch $S_5$ is opened so that, the automatic current supply circuit returns to the current-supplying condition from previous motor-arresting condition.

When the present mechanism is to be applied to a camera wherein the time duration from the shutter release pin returning action to completion of shutter closure action is longer than the time duration from the returning of the release lever 22 to the start of film winding, a resistor R is serially inserted in the bulb circuit as shown in broken lines in FIG. 1. Then, since during camera shutter operation the responsive switch $S_6$ is open current supply to the motor 1 is made through this resistor circuit and the supplied current is controlled by the value of the resistor R. Thus, the motor 1 operates with low speed and lengthens the time duration from the returning of the release lever 22 to the start of film winding. When shutter operation is completed, the operating rod 36 acts to close the responsive switch $S_6$, so that said resistor circuit is short circuited. Then, the motor 1 is put into a high-speed operation and driving power is supplied to carry out film-winding and shutter-charging operation in a manner as mentioned before.

The changeover operation among the aforementioned successive, one frame and bulb exposure photographing operations may be carried out in a positive and effective manner by utilizing the changeover cam 40 for switch operation. Where the changeover dial 39 is so rotated as to bring the successive photographing index C into registration with the fixed index, the changeover pin 41 engages the first step 40a of the changeover cam 40 and operates the switch $S_1$ so as to close the contact C. When the changeover dial 39 is so rotated as to bring the one frame photographing index S into registration with the fixed index, the second step 40b causes the changeover pin 41 to be moved upward so that the switch $S_1$ is so changed over as to close the contact S. When the changeover dial 39 is so rotated as to bring the bulb exposure index B into registration with fixed index, the changeover pin 41 engages the third step 40c, so that, with the switch $S_1$ closed on the contact S-side, the bulb switch $S_8$ is closed and the switch $S_9$ is opened. Thus, operation of the changeover dial 39 will operate the switches $S_1$, $S_8$ and $S_9$ as required for corresponding controls.

Thus, according to the invention, positive and accurate photographing operation can be carried out in the following manner: In the motor-arresting circuit which is established upon bulb exposure shutter release through changeover of a responsive switch, a switch is provided between the motor and the responsive switch to be opened upon closure of the bulb switch so as to prevent short circuit of the current source circuit due to closure of said motor-arresting circuit. Between said responsive switch and the current source there is provided a switch for changeover between a single frame photographing circuit and a successive frame photographing circuit so that operation of said switch will, upon successive photographing, establish a circuit for directly controlling the current supply to the motor through current source connection due to the operation of the responsive switch; and, upon one frame photographing, the responsive switch and one terminal of the motor is connected; and further upon bulb exposure photographing, single frame photographing circuit is established and also motor arresting operation is carried out as in other shutter operations.

Further practical advantage of the present invention is that changeover among bulb exposure, successive and one frame photographing operations is carried out through one device so as to fully prevent such accident that with a desire for bulb exposure photographing the user forgets the changeover of the switch and operates the camera in the successive photographing state.

I claim:

1. An automatic film frame advancing mechanism comprising a film takeup member, an electric motor, a drive transmission means connecting said motor to said takeup member, a voltage source, a selector first switch responsive to said transmission means and including alternatively closed first and second sections, a shutter release second switch connected in series with first section of said first switch between said motor and said voltage source, a third selectively actuatable switch, a fourth switch responsive to the exposure operation of said camera shutter connected across said third switch, a fifth switch actuatable with said second switch, and means connecting said first switch second section and said third switch and said fifth switch in series across said motor.

2. An automatic film frame advancing mechanism comprising a film takeup member, an electric motor, a drive transmission means connecting said motor to said takeup member, a voltage source, a selector first switch responsive to said transmission means and including alternatively closed first and second sections, a shutter release second switch connected in series with said first section of said first switch between said motor and said voltage source, a third selectively actuatable switch, a fourth switch responsive to the exposure operation of said camera shutter connected across said third switch, a fifth switch actuatable with said second switch, means connecting said first switch second section and said third switch and said fifth switch in series across said motor, a sixth switch operable with said third switch, and a seventh switch operable with said fourth switch, said first switch second section and said sixth and seventh switches being connected in series across said motor.

3. An automatic film frame advancing mechanism comprising a film takeup member, an electric motor, a drive transmission means connecting said motor, to said takeup member, a voltage source, a selector first switch responsive to said transmission means and including alternatively closed first and second sections, a shutter release second switch connected in series with said first section of said first switch between said motor and said voltage source, a third selectively actuatable switch, a fourth switch responsive to the exposure operation of said camera shutter connected across said third switch, a fifth switch actuatable with said second switch, and means connecting said first switch, second section and said third switch and said fifth switch in series across said motor, and including a selectively alternatively closed two section eighth switch, a first section of which is connected in series between said fourth and fifth switches and the second section of which is connected in series between said fourth switch and said voltage source.

4. The mechanism of claim 3 including a ninth switch operable with said second switch and connected across said eighth switch second section.

5. The mechanism of claim 2 wherein said third and sixth switches are in oppositely opened and closed conditions.

6. The mechanism of claim 2 wherein said fourth and seventh switches are in oppositely opened and closed conditions.

7. The mechanism of claim 4 wherein said second and fifth switches are normally open and said ninth switch is normally closed.

8. The mechanism of claim 4 wherein said sixth switch and said eighth switch first section are normally urged to a closed position and said third switch and said eighth switch second section are normally urged to closed positions and including means for concurrently actuating said third sixth and eighth switch sections to respective opposite positions.

9. The mechanism of claim 4 including a resistor connected between said third and ninth switches 10. An electrically driven automatic film-winding arrangement for photographic camera characterized in that between the driving motor and the current source there are provided a manual current supply circuit wherein a shutter release-actuating switch $S_3$ to be manually operated by the shutter-actuating button is serially connected and an automatic current supply circuit having, serially connected, a switch $S_1$ for changeover between the successive photographing operation circuit and the one frame photographing operation circuit and a responsive switch $S_6$ to be closed in the last stage of shutter release operation; these two current supply circuits being connected in parallel with each other so as to be changed over to each other by means of a switch $S_2$ which acts in response to the action of the film-winding driving power transmission arrangement; in said automatic current supply circuit a bulb switch $S_8$ which is to be closed only upon bulb shutter action is connected in parallel with said responsive switch $S_6$, a motor arresting circuit is established connecting said switch $S_1$ and a switch $S_9$ which is opened upon bulb shutter action in parallel with each other so as to short circuit the input terminals of the motor; and another motor-arresting circuit is established connecting said switch $S_1$ and a switch $S_5$ which is closed through depression of said shutter-actuating button in series with the input terminal of the motor, so that the operation of the motor can be abruptly stopped when required in successive, on frame and bulb exposure photographing operations.

11. An electrically driven automatic film-winding arrangement for photographic camera characterized in that between the driving motor and the current source there are provided a manual current supply circuit wherein a shutter release-actuating switch $S_3$ to be manually operated by the shutter-actuating button is serially connected and an automatic current supply circuit having serially connected, a switch $S_1$ for changeover between the successive photographing operation circuit and the one frame photographing operation circuit and a responsive switch $S_6$ to be closed in the last stage of shutter release operation, these two current supply circuits being connected in parallel with each other so as to be changed over to each other by means of a switch $S_2$ which acts in response to the action of the film-winding driving power transmission arrangement; in said automatic current supply circuit a bulb switch $S_8$ which is to be closed only upon bulb shutter action is connected in parallel with said responsive switch $S_6$, a motor-arresting circuit is established connecting said switch $S_1$ and a switch $S_9$ which is opened upon bulb shutter action in parallel with each other so as to short circuit the input terminals of the motor; and another motor-arresting circuit is established connecting said switch $S_1$ and a switch $S_5$ which is closed through depression of said shutter-actuating button in series with the input terminal of the motor, for operation of the switch $S_1$, the bulb switch $S_8$ and the switch $S_9$ a common operating device is provided; when this device is set to successive photographing position the switch $S_1$ is closed to the successive photographing operation circuit side, the bulb switch $S_8$ is opened and the switch $S_9$ is closed; when said device is set to one frame photographing position the switch $S_1$ is changed over to the one frame photographing operation circuit side; and when said device is set to the bulb exposure position, with the switch $S_1$ closed to the one frame photographing operation circuit side, the bulb switch $S_8$ is closed and the switch $S_9$ is opened.